United States Patent [19]

Hunger et al.

[11] Patent Number: 4,491,445
[45] Date of Patent: Jan. 1, 1985

[54] TOOL HOLDER FOR HAMMER DRILLS

[75] Inventors: Josef Hunger, Munich; Wilhelm Klueber, Königsbrunn; Wolfgang Regelsberger, Weissenburg, all of Fed. Rep. of Germany

[73] Assignee: Hilti Aktiengesellschaft

[21] Appl. No.: 407,798

[22] Filed: Aug. 13, 1982

[30] Foreign Application Priority Data

Aug. 17, 1981 [DE] Fed. Rep. of Germany ....... 3132449

[51] Int. Cl.³ .......................... B23C 9/00; B23B 31/10
[52] U.S. Cl. .................................. 409/234; 173/133; 279/19.3; 279/60; 279/75
[58] Field of Search .......................... 279/1 B, 60–64, 279/19.1–19.7, 36, 42, 48, 56, 75, 97, 99, 100, 101; 408/239 R; 409/232, 234; 173/48, 133, 139

[56] References Cited

U.S. PATENT DOCUMENTS

| | | | |
|---|---|---|---|
| 2,253,345 | 8/1941 | Palmgren | 279/60 |
| 3,325,166 | 6/1967 | McCarthy et al. | 279/1 ME |
| 3,545,776 | 12/1970 | Haviland | 279/63 |
| 4,131,165 | 12/1978 | Wanner et al. | 279/75 X |
| 4,277,074 | 7/1981 | Kilberis | 279/60 |

FOREIGN PATENT DOCUMENTS 2030485 4/1980 United Kingdom ............... 279/19.6

Primary Examiner—William R. Briggs
Attorney, Agent, or Firm—Toren, McGeady and Stanger

[57] ABSTRACT

In a tool holder for securing a tool in a hammer drill in a form-locking manner, locking elements are radially displaceably mounted in a guide member. An adjustment ring is threaded onto the guide member and by rotating the adjustment ring relative to the guide member, the locking elements can be adjustably tightened or loosened. The locking elements seat in closed end recesses in the shank of the tool to be secured. The adjustment ring can be locked in different rotational positions by an interlocking tooth arrangement. Teeth are provided on the adjustment ring and on a fixing sleeve axially slidably positioned on the guide member. The fixing sleeve can be moved axially between a position for locking the adjustment ring and another position permitting the adjustment ring to be rotated relative to the guide member. The surface on the adjustment ring adjustably positioning the locking elements is frustoconically shaped so that the locking elements are radially displaceable for engaging tool shanks of different diameters.

6 Claims, 4 Drawing Figures

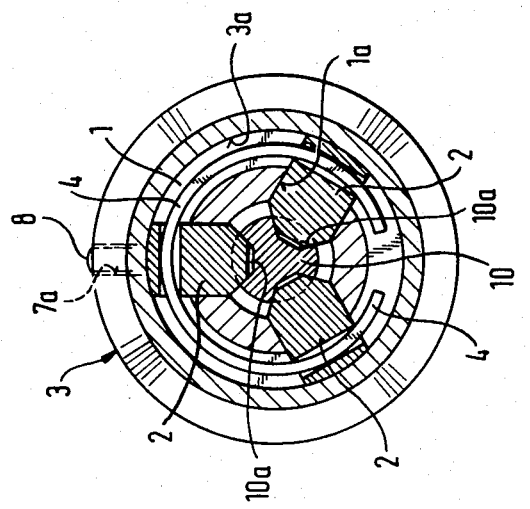
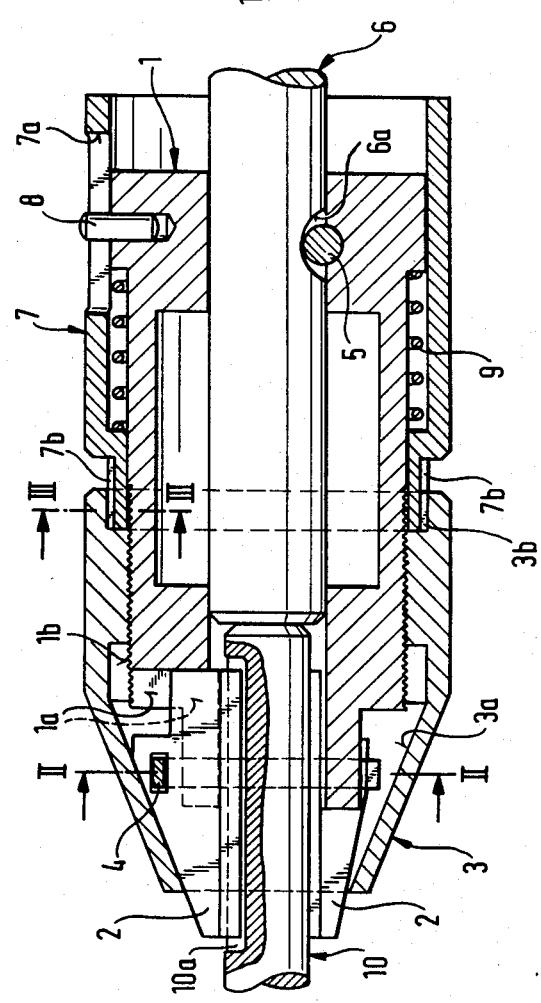

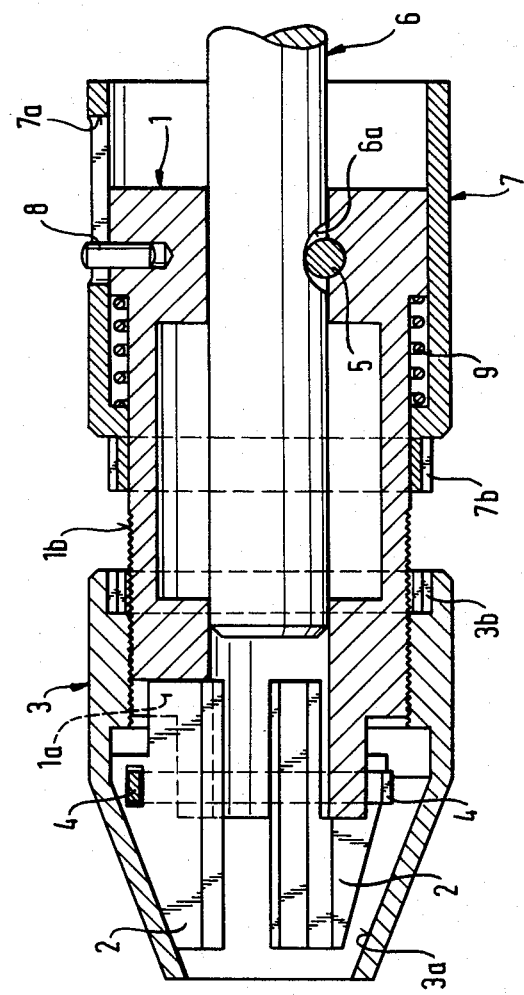
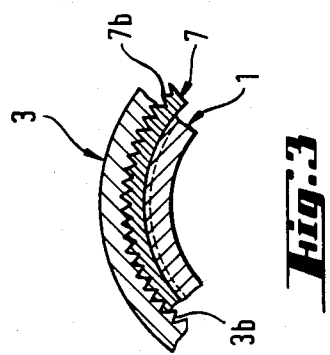

TOOL HOLDER FOR HAMMER DRILLS

SUMMARY OF THE INVENTION

The present invention is directed to a tool holder for securing a tool in a hammer drill. Locking elements are radially adjustably supported in a guide member for at least partial engagement within closed end recesses in the tool shank. An adjustment ring is rotatably mounted on the guide member and adjusts the position of the locking elements in the radial direction. An axially slidable fixing sleeve is positioned on the guide member and can be engaged in a form-locking member with the adjustment ring preventing rotation of the adjustment ring relative to the guide member.

In hammer drills of this known type, in addition to rotary motion, an impacting or striking motion is transmitted by an intermediate shaft to a tool inserted into a tool holder. To transfer these combined motions, the tool is held in the tool holder locked against relative rotation, however, a certain limited axial play is available. All tools intended for use in a specific drill have the same shank diameter corresponding to the guide region of the tool holder. The transfer of the torque, as well as axial force, is effected by axially closed recesses, that is, closed end recesses, in the shank within which the locking elements in the tool holder seat in a form-locking manner. Usually, the locking elements are supported in a guided manner and can be radially engaged or disengaged by a rotatable or slidable adjustment ring. Due to the path determined by the adjustment ring, in known hammer drills there is a uniform depth of the recesses formed in the tool shank. As a consequence, the tool holder can only accept tools of a specific shank diameter. In addition, this disadvantage results in that large differences in diameter occur between the working diameter of the drill and its shank. If the shank is designed for tools with a smaller diameter, then it is too weak for larger tools. If the shank is designed for tools with a larger diameter, however, then the smaller tools are very complicated concerning their material content as well as the cutting or non-cutting shaping of the tool so that economical manufacture of such tools is not possible.

To prevent a loosening of the adjustment ring because of vibrations developed during drilling operations including impacting, it is also known to utilize an axially movable fixing sleeve for locking the adjustment ring relative to the guide member.

The disadvantage of such a solution is that only one locking position is possible and, accordingly, the locking elements can be fixed only in one position which, in turn, leads to the above-mentioned problems concerning the dimensioning of the tools.

Therefore, it is the primary object of the present invention to provide a tool holder for securing tools with closed end recesses so that locking elements can be provided for engagement into recesses in different positions.

In accordance with the present invention, the adjustment ring for the locking elements can be locked in at least two positions by the fixing sleeve for each full turn or revolution of the adjustment ring relative to the guide member. Thus, for each full turn of the adjustment ring, there are at least two positions of the locking elements for centering the tool. For the intended range of adjustment of the locking element, however, usually several turns of the adjustment ring are needed. This results in a plurality of fixing positions of the locking elements which are uniformly distributed over the entire adjustment ring.

To prevent loosening of the fixing sleeve because of vibrations developed during drilling including percussion or impacting, one or a number of spring elements can be provided for biasing the fixing sleeve into the locking position. In place of spring elements, it is also possible to provide a stop device for securing the fixing sleeve in the locking position.

To provide an optimum gradation of the fixable positions of the locking elements, it is advantageous to provide for the locking of the adjustment ring to the guide member using a toothed construction on the fixing sleeve which interacts with a counter toothed construction on the adjustment ring. Basically, it is sufficient if one of the toothed constructions has only one tooth, however, for uniform force distribution, a complete toothed construction is preferred on both of the interlocking members.

The toothed construction or the counter toothed construction may, for instance, be in the form of an axially engaging frontal toothed arrangement. During drilling operations incorporating percussion, however, vibrations are developed such that due to axial sliding of the fixing sleeve, the inter-engaged toothed constructions may become disengaged. To prevent such an occurrence, it is advantageous to provide a telescoped intergagement of the toothed construction and the counter toothed construction affording an axially extending tooth configuration. If there is an adequate axial path for the engagement of the two toothed constructions, disengagement of the interlocking toothed constructions is prevented even when exposed to the maximum vibration effect.

The shape of the toothed construction may be selected as desired with regard to its function, for manufacturing reasons, however, it is advantageous when the toothed construction and the counter toothed construction are formed as a serrated connection. Since the mechanical stress on the toothed constructions is relatively minor, the serrations may be produced in a milling operation. With a serrated connection, it is possible to provide a plurality of positions affording mutual engagement between the two members and consequently a fine gradation of the fixable positions of the locking elements. For instance, a specific radial play between the locking elements and the tool shank can be set.

For ease in handling, it is advantageous if the fixing sleeve is secured with the guide member so that there is no relative rotation between them. Consequently, the adjustment ring must be rotated relative to the fixing sleeve for adjusting the locking elements. The fixing sleeve, secured to rotate with the guide member, can serve during adjustment of the tool holder as an abutment. Accordingly, an operator can hold the fixing sleeve with one hand and the adjustment ring with the other. The counter toothed construction is located on the adjustment ring.

The various features of novelty which characterize the invention ae pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of a tool holder embodying the present invention with a tool inserted in the locked position;

FIG. 2 is a cross sectional view taken along the line II—II in FIG. 1

FIG. 3 is a cross sectional view taken along the line III—III in FIG. 1; and

FIG. 4 is a view of the tool holder similar to that shown in FIG. 1, however, the tool holder is in the unlocked position.

DETAILED DESCRIPTION OF THE INVENTION

The tool holder illustrated in FIGS. 1-4 is used with a hammer drill where both rotational and impact forces are transmitted to a tool secured in the tool holder. As viewed in FIGS. 1 and 4, the front end of the tool holder is its left hand end into which the tool is inserted and the right hand end is its rear end. The tool holder includes an axially extended guide member 1 with its axial direction extending in the front end-rear end direction of the holder. Axially extending the slots 1a are located in the front end of the guide member and are open in the radial direction with locking elements 2 radially slidable in the slots. An adjustment ring 3 coaxial with the guide member is screwed onto the axially extending thread 1b on the outer surface of the guide member. As can be seen in FIG. 2, locking elements 2 are biased by an annular spring 4 against the frusto-conically shaped inside surface 3a of the adjustment ring 3. As can be seen in FIG. 1 and FIG. 4, the inside surface 3a of the adjustment ring widens from the front end toward the rear end of the tool holder. Depending on the direction in which the adjustment ring is screwed on the guide member 1, the locking elements are moved radially inwardly or outwardly. Toward its rear end, the guide member 1 is connected by a pin 5 to an anvil 6 with the connection permitting the transfer of both rotary and impacting motion. The anvil 6 has arcuately shaped recesses 6a which are somewhat longer in the axial direction of the tool holder than the diameter of the bolt 5 so that the anvil 6 and the guide member 1 are secured together for rotation, however, there is a specific axial play between the two. This axial play is needed for the direct transfer of the impacting force to a tool 10 inserted into the tool holder. The shank of the tool 10 inserted into the tool holder has axially closed or closed end recesses 10a and these recesses are longer in the axial direction of the tool holder than the locking elements, note FIG. 1, whereby the tool 10 is axially movable to a limited extent relative to the locking elements.

Rearwardly of the adjustment ring 3, the guide member 1 is laterally enclosed by a fixing sleeve 7. The fixing sleeve 7 has an axially extending slot 7a with a pin 8 seated within a radially extending blind bore in the guide member 1 and projecting outwardly into the slot 7a. The interconnection of the pin 8 with the slot 7a secures the fixing sleeve 7 to the guide member 1 so that they rotate together, however, a certain axial sliding movement is provided for the fixing sleeve relative to the guide member. The front end of the fixing sleeve 7 facing toward the rear end of the adjustment ring 3 is provided with axially extending serrations 7b on its radially outwardly facing surface. The front end of the fixing sleeve 7 is stepped in-wardly relative to the remainder of its outside diameter and to the outside diameter of the adjustment ring. At the rear end of the adjustment ring 3, its inside surface is stepped outwardly and an inner serration 3b is formed in this outwardly stepped surface. Accordingly, in the locked position, the front end of the fixing sleeve 7 telescopically engages within the rear end of the adjustment ring 3 in a form-locking manner. Fixing sleeve 7 is biased into locking engagement with the adjustment ring 3 by a compression spring 9. As long as the adjustment ring 3 and the fixing sleeve 7 are in inter-engagement provided by the serrations 3b, 7b, rotation of the ring 3 with respect to the guide member 1 is prevented so that the position of the elements is maintained.

As can be seen in FIG. 2, three locking elements 2 are slidably supported within the radially extending slots 1a in the guide member 1. Annular spring 4 biases the locking elements against the frusto-conically shaped inside surface of the adjustment ring 3. Accordingly, as the frusto-conically shaped inside surface 3a moves relative to the locking elements 2 and depending on its direction of movement, the locking elements are moved radially inwardly or outwardly.

In FIG. 3, the form-locking engagement of the outer serration 7b of the fixing sleeve 7 with the inner serration 3b of the adjustment ring 3 is illustrated. During its sliding movement in the axial direction, fixing sleeve 7 is guided on the surface of the guide member 1.

As shown in FIG. 4, the adjustment ring 3 has been moved in the axial direction forwardly relative to the guide member 1 and, as a consequence, the locking elements 2 under the biasing action of the spring 4 have been displaced radially outwardly into their outermost position and the tool 10, shown in FIG. 1, has been removed. To effect the displacement of the adjustment ring 3, the fixing sleeve 7 has previously been moved in the rearward direction against the biasing action of the spring 9. After the shank of the tool 10 is inserted into the tool holder, the locking elements can be moved radially inwardly by displacing the adjustment ring so that the locking elements engage within the closed end recesses 10a in the tool shank. Subsequently, by releasing the fixing sleeve 7, due to the action of the compression spring 9, the sleeve is moved forwardly into the locking position in telescopic inter-engagement with the feed ring as shown in FIG. 1.

While specific embodiments of the invention have been shown and described in detail to illustrate the application of the inventive principles, it will be understood that the invention may be embodied otherwise without departing from such principles.

We claim:

1. A tool holder arranged to receive and secure a tool in a hammer drill, comprising an axially extending guide member, a plurality of locking elements supported in said guide member and said locking elements are radially adjustably positionable relative to said guide member for engagement within closed end recesses in the shank of the tool inserted into the tool holder, an adjustment ring is mounted on said guide member for adjustably positioning said locking elements, said adjustment ring being rotatable relative to said guide member for effecting the radial adjustment of said locking elements, a fixing sleeve axially slidably mounted on said guide member and displaceable between a first position for locking said adjustment ring and a second position for releasing said adjustment ring for rotation relative to said guide member, said adjustment ring can be locked by said fixing sleeve in at least two positions for each complete turn of said adjustment ring relative to said guide member, and a toothed construction is provided on said fixing sleeve and a counter toothed construction is on said adjustment ring so that the inter-engagement of said toothed construction and said counter toothed construction locks said adjustment ring against rotation relative to said guide member, and said toothed construction on said fixing sleeve extends in the axial direction thereof and faces radially outwardly and the counter toothed construction on said adjustment ring extends in the axial direction and faces radially inwardly so that said toothed and counter toothed constructions interengage in a telescoping manner.

2. A tool holder, as set forth in claim 1, wherein each said toothed construction and said counter toothed construction is formed as a serrated surface for affording locking inter-engagement of said adjustment ring and said fixing sleeve.

3. A tool holder, as set forth in claims 1 or 2, wherein said fixing sleeve is secured to said guide member for rotation with said guide member.

4. A tool holder, as set forth in claims 1 or 2, wherein said asjustment ring laterally encloses said locking elements, said adjustment ring having a frusto-conically shaped inside surface, said locking elements having correspondingly inclined outside surfaces, a spring member biasing the outside surfaces of said locking elements against the frusto-conically shaped inside surface of said adjustment ring so that axial displacement of said adjustment ring effects radially inward or radially outward movement of said locking elements.

5. A tool holder, as set forth in claims 1 or 2, wherein an anvil extends axially through the bore in said guide member in the direction toward said adjustment ring, and means for interconnecting said guide member and said anvil for transmitting rotary and impacting forces therebetween.

6. A tool holder, as set forth in claims 1 or 2, wherein said guide member has axially and radially extending slots therein with said locking elements mounted in and guided by said slots.

* * * * *